Figure 1:
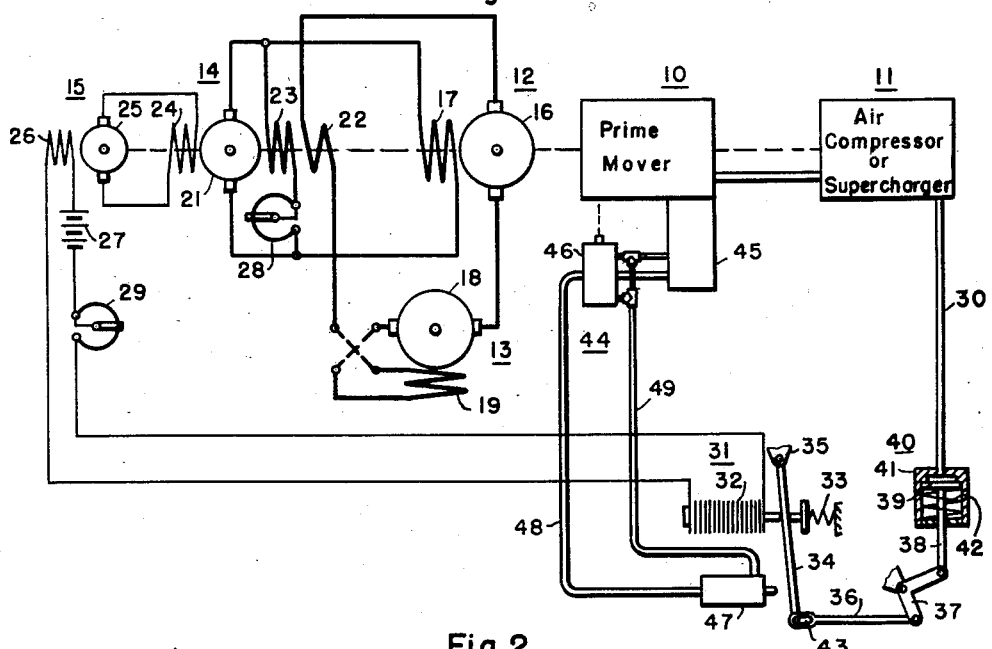

March 20, 1951     J. J. STAMM     2,546,023

LOCOMOTIVE CONTROL SYSTEM

Filed March 1, 1949

WITNESSES:

INVENTOR
John J. Stamm.
ATTORNEY

Patented Mar. 20, 1951

2,546,023

UNITED STATES PATENT OFFICE 2,546,023

LOCOMOTIVE CONTROL SYSTEM

John J. Stamm, Media, Pa., assignor to Westinghouse Electric Corporation, East Pittsburgh, Pa., a corporation of Pennsylvania Application March 1, 1949, Serial No. 79,078

6 Claims. (Cl. 290—8)

My invention relates, generally, to locomotive control systems and, more particularly, to systems for controlling the operation of locomotives of the self-propelled type, such as Diesel-electric and gas-turbine-electric locomotives.

A Diesel-electric or a gas-turbine electric locomotive may be accelerated from standstill by increasing the voltage applied to the traction motors, either by controlling the excitation of the field winding of the main generator by means of a master controller, or by means of a mechanically, hydraulically or pneumatically operated throttle mechanism which also controls the excitation of the field winding of the main generator, or the field winding of the exciter which supplies the excitation current for the field winding of the main generator. In either case there is a possibility of stalling the prime mover if the load on the generator is increased faster than the speed of the prime mover.

An object of my invention is to provide for automatically increasing the excitation of the main generator on a self-propelled locomotive in accordance with the speed of the prime mover.

Another object of my invention is to prevent overloading or stalling the prime mover while accelerating the locomotive.

A further object of my invention is to provide a combined accelerating and load regulating system for a self-propelled locomotive.

A more general object of my invention is to provide a control system for a self-propelled locomotive which shall be simple and efficient in operation and which may be economically manufactured and installed.

Other objects of my invention will be explained fully hereinafter or will be apparent to those skilled in the art.

In accordance with one embodiment of my invention, the air pressure of the compressor for a gas turbine or the supercharger for a Diesel engine is utilized to control the field excitation of the generator or exciter on a gas-turbine-electric or a Diesel-electric locomotive, thereby eliminating the need for field control by the master controller or throttle. The air pressure of the compressor or supercharger is a function of the speed of the turbine or engine, and the temperature and the density of the intake air. Therefore, it is only necessary to increase the speed of the turbine or Diesel engine and the load will be applied automatically in response to the compressor or supercharger pressure. Since this pressure is a direct measure of the ability of the prime mover to develop power, it is possible, by proper proportioning of the control means, to match the output of the generator with that of the prime mover. This will prevent overloading or stalling of the gas turbine or Diesel engine.

Figure 2:
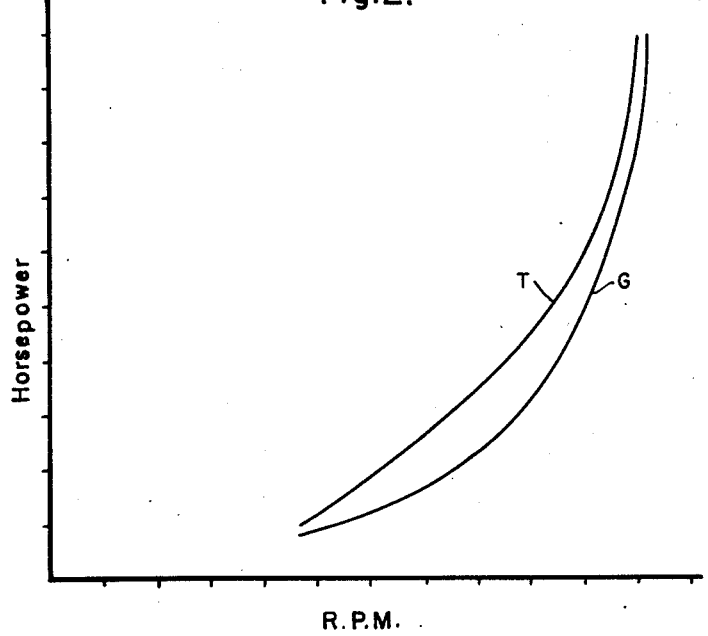

For a better understanding of the nature and objects of my invention, reference may be had to the following detailed description, taken in conjunction with the accompanying drawing, in which:

Figure 1 is a diagrammatic view of a locomotive control system embodying the principal features of my invention, and Fig. 2 is a set of curves illustrating operating characteristics of the system shown in Fig. 1.

Referring to the drawing, and particularly to Fig. 1, the system shown therein comprises a prime mover 10, which may be either a gas turbine or a Diesel engine; an air compressor or supercharger 11, which supplies compressed air to the prime mover 10; a generator 12, which supplies current to a traction motor 13; a main exciter 14, and a pilot exciter 15. As shown, the compressor 11, the generator 12, the main exciter 14 and the pilot exciter 15 are all driven by the prime mover 10.

The generator 12 is provided with an armature winding 16 and a field winding 17. The motor 13 is provided with an armature winding 18 and a series field winding 19. The field winding 17 of the generator 12 is energized from an armature winding 21 of the main exciter 14. This exciter is provided with a differential field winding 22 which is connected in series-circuit relation with the traction motor 13 and the armature 16 of the generator 12. The exciter 14 is also provided with a shunt field winding 23 and a separately excited field winding 24 which is energized from an armature winding 25 of the pilot exciter 15. The pilot exciter 15 is provided with a field winding 26 which is energized from a battery 27. Manually operable rheostats 28 and 29 may be provided for adjusting the current in the field windings 23 and 26, respectively.

In order to provide for automatically increasing the output of the generator 12, thereby accelerating the locomotive or vehicle which is propelled by the motor 13 without stalling the prime mover 10, a variable resistance device 31 is provided for controlling the energization of the field winding 26 of the pilot exciter 15, which, in turn, controls the energization of the field winding 24 of the main exciter 14, thereby controlling the excitation of the generator 12 and the voltage of the generator. As shown the variable resistance device 31 comprises a stack of carbon discs 32 which are connected in the circuit for the field winding 26 and may be compressed by a spring 33 which biases a lever 34 to compress the discs 32. The lever 34 is pivoted at 35 and compresses the discs 32 when actuated in one direction, and releases the pressure on the discs when actuated in the opposite direction. As is well known, the resistance of the carbon pile 32 varies with the pressure applied to the discs.

As shown, the end of the lever 34 is connected by a link 36 and a bell-crank lever 37 to a piston rod 38 for a piston 39 of a pressure-responsive device 40. The piston 39 is disposed in a cylinder 41. The cylinder 41 is connected to the compressor or supercharger 11 by a pipe 30. Thus the piston 39 is actuated downwardly by the pressure developed by the compressor or supercharger 11 and is actuated upwardly by a spring 42 disposed inside of the cylinder 41. A slot 43 is provided in the end of the link 36 which is connected to the lever 34, thereby providing a lost motion connection between the fluid pressure actuated piston 39 and the lever 34.

As explained hereinbefore, the air pressure of the compressor or supercharger 11 is a function of the speed of the prime mover 10, and the temperature and the density of the intake air. Since this pressure is a direct measure of the ability of the prime mover to develop power, it is thus possible, by proportioning of the control means, to match the output of the prime mover with that of the generator, thereby preventing overloading or stalling of the prime mover while accelerating the locomotive or vehicle.

Furthermore, as previously mentioned, the pressure of the compressor or supercharger is a function of the air temperature and density. Thus, when operating the locomotive at a low air temperature the compressor pressure will be higher, thereby permitting quicker loading of the turbine or Diesel-engine, which are capable of developing more power at low air temperatures. When the locomotive is operating at high altitudes or high air temperatures the supercharger or compressor pressure is low and the loading of the generator is slower.

In order to permit the prime mover to operate at substantially a constant speed after the vehicle is accelerated a load regulator 44 is provided to cooperate with the pressure responsive device 40 in controlling the operation of the variable resistance device 31. The load regulator 44 may be of the type disclosed in Patent No. 2,340,994, issued February 8, 1944 to W. H. Smith. As shown, the load regulator comprises a combined governor and control valve 45, an auxiliary control valve 46 and a power piston 47 which is connected to the valve 46 by pipes 48 and 49. As described in the aforesaid patent, oil is delivered under pressure from the governor and control valve 45 to the auxiliary control valve 46 which is rotated at a speed corresponding to the speed of the prime mover 10. The oil is delivered intermittently from the valve 46 to the power piston 47, thereby applying a pressure to the piston 47 which is proportional to the speed of the prime mover.

The fluid pressure device 40 and the load regulator 44 function to control the generator output in the following manner:

When the locomotive is being accelerated and the speed of the prime mover is low, the compressor or supercharger pressure is low and the variable resistance device 31 is expanded by the spring 42 operating through the linkage mechanism, thereby inserting a relatively high resistance in the circuit for the field winding 26 of the pilot exciter 15. This results in a low excitation for the main exciter 14 and the generator 12, which causes the generator to develop a low voltage for starting the locomotive.

Increasing the speed of the prime mover by means of the throttle mechanism (not shown) will increase the pressure developed by the compressor or supercharger 11, thereby actuating the piston 39 downwardly and permitting the spring 33 to compress the carbon pile 32 to decrease the resistance in the circuit for the field winding 26 of the pilot exciter 15. By the cumulative action of increased pilot and main exciter speeds with the increased excitation, the voltage developed by the generator 12 increases, thereby raising the voltage applied to the motor 13 and increasing the speed of the locomotive.

As illustrated by the curves in Figure 2, the characteristics of the generator, shown by the curve G, may be so controlled, by the proper proportioning of the various parts of the regulating system, that the loading curve of the generator follows closely the loading curve T of the prime mover. It is essential that the curve G be below the curve T at all times during the operation of the locomotive to prevent stalling of the prime mover.

As explained hereinbefore, the load regulator 44 functions to control the load on the generator 12 to permit the prime mover to operate at substantially a constant speed after the locomotive has been accelerated. It will be seen that the power piston device 47 limits the movement of the lever 34 in a direction to compress the carbon pile 32. Furthermore, the slot 43 permits the power piston 47 to actuate the lever 34 in a direction to decrease the pressure on the discs 32.

Thus, if the prime mover becomes overloaded and its speed decreases, the load regulator 44 functions to increase the resistance in the circuit for the field winding 26 of the pilot exciter 15, thereby decreasing the generator voltage and the output of the generator. In this manner the speed of the prime mover is permitted to increase slightly. Likewise, if the speed of the prime mover increases above its normal speed, the load regulator 44 functions to decrease the resistance in the circuit for the field winding 26 of the pilot exciter, thereby increasing the load on the generator and decreasing the speed of the prime mover.

From the foregoing description it is apparent that I have provided a system for automatically applying the load to the prime mover of a locomotive or vehicle in accordance with the speed of the prime mover, thereby eliminating the possibility of overloading or stalling the prime mover while the load is being applied. Furthermore, the present system permits maximum output to be obtained from the prime mover under varying conditions of air temperature and density. The present system also functions to maintain a constant speed of the prime mover after the load has been applied.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a prime mover, a generator driven by the prime mover and having an armature winding and a field winding, exciting means for energizing said field winding, variable-resistance means for controlling the energization of said field winding, a fluid compressor driven by the prime mover to supply a compressed fluid to the prime mover, pressure-responsive means actuated by the fluid pressure developed by said compressor, regulating means responsive to the speed of the prime mover, and lost-motion means connecting the pressure-responsive means and the regulating means to the variable-resistance means independently of each other, said lost-motion connections being disposed to permit said regulating means and said pressure-responsive means to cooperate in controlling the operation of said variable-resistance means.

2. In a control system, in combination, a prime mover, a generator driven by the prime mover and having an armature winding and a field winding, exciting means for energizing said field winding, a variable-resistance means for controlling the energization of said field winding, a fluid compressor driven by the prime mover to supply a compressed fluid to the prime mover, pressure-responsive means actuated by the fluid pressure developed by said compressor, load-regulating means responsive to the speed of the prime mover, and lost-motion means connecting the pressure-responsive means and the regulating means to the variable-resistance means independently of each other, said lost-motion connections being disposed to permit said load-regulating means and said pressure-responsive means to jointly control the operation of said variable-resistance means to control the excitation of said generator.

3. In a control system, in combination, a prime mover, a generator driven by the prime mover and having an armature winding and a field winding, exciting means for energizing said field winding, variable-resistance means for controlling the energization of said field winding, a fluid compressor driven by the prime mover to supply a compressed fluid to the prime mover, pressure-actuated means responsive to the fluid pressure developed by said compressor for controlling said variable-resistance means to increase the generator excitation, load-regulating means responsive to the speed of the prime mover for controlling said variable-resistance means to decrease the generator excitation, and lost-motion means connecting the pressure-actuated means and the load-regulating means to the variable-resistance means independently of each other.

4. In a control system, in combination, a prime mover, a generator driven by the prime mover and having an armature winding and a field winding, exciting means for energizing said field winding, variable-resistance means for controlling the energization of said field winding, a fluid compressor driven by the prime mover to supply a compressed fluid to the prime mover, pressure-actuated means responsive to the fluid pressure developed by said compressor for controlling said variable-resistance means to increase the generator excitation, load-regulating means responsive to the speed of the prime mover for controlling said variable-resistance means to decrease the generator excitation, a lost-motion connection between said pressure-actuated means and said variable-resistance means, and an additional lost-motion connection between said load-regulating means and said variable-resistance means.

5. In a control system, in combination, a prime mover, a generator driven by the prime mover and having an armature winding and a field winding, exciting means for energizing said field winding, variable-resistance means for controlling the energization of said field winding, a fluid compressor driven by the prime mover to supply a compressed fluid to the prime mover, pressure-actuated means responsive to the fluid pressure developed by said compressor for controlling said variable-resistance means to increase the generator excitation, load-regulating means responsive to the speed of the prime mover for controlling said variable-resistance means to decrease the generator excitation, a lever arm for actuating said variable-resistance means, spring means for biasing said lever arm in one direction, a lost-motion connection between said lever arm and said pressure-actuated means, and an additional lost-motion connection between said lever arm and said load-regulating means.

6. In a control system, in combination, a prime mover, a generator driven by the prime mover and having an armature winding and a field winding, exciting means for energizing said field winding, variable-resistance means for controlling the energization of said field winding, a fluid compressor driven by the prime mover to supply a compressed fluid to the prime mover, pressure-actuated means responsive to the fluid pressure developed by said compressor for controlling said variable-resistance means to increase the generator excitation, load-regulating means responsive to the speed of the prime mover for controlling said variable-resistance means to decrease the generator excitation, a lever arm for actuating said variable-resistance means, spring means for biasing said lever arm in one direction, a lost-motion connection between said lever arm and said pressure-actuated means, and an additional lost-motion connection between said lever arm and said load-regulating means, said load-regulating means being disposed to oppose said spring means.

JOHN J. STAMM.

REFERENCES CITED

The following references are of record in the file of this patent:

UNITED STATES PATENTS

| Number | Name | Date |
| --- | --- | --- |
| 1,280,587 | Thury | Oct. 1, 1918 |
| 1,745,130 | Turner | Jan. 28, 1930 |
| 1,806,705 | Post, Jr. | May 26, 1931 |
| 2,050,068 | Schaer | Aug. 4, 1936 |
| 2,281,987 | Oswald | May 5, 1942 |
| 2,311,285 | Stamm | Feb. 16, 1943 |
| 2,340,994 | Smith | Feb. 8, 1944 |
| 2,393,621 | Adams | Jan. 29, 1946 |
| 2,472,924 | Schwendner | June 14, 1949 |

FOREIGN PATENTS

| Number | Country | Date |
| --- | --- | --- |
| 456,119 | Great Britain | Nov. 3, 1936 |
| 714,683 | France | Sept. 8, 1931 |